United States Patent [19]

Shetty et al.

[11] Patent Number: 5,189,490
[45] Date of Patent: Feb. 23, 1993

[54] METHOD AND APPARATUS FOR SURFACE ROUGHNESS MEASUREMENT USING LASER DIFFRACTION PATTERN

[75] Inventors: Devdas Shetty, West Hartford; Henry Neault, Tolland, both of Conn.

[73] Assignee: University of Hartford, West Hartford, Conn.

[21] Appl. No.: 767,222

[22] Filed: Sep. 27, 1991

[51] Int. Cl.⁵ ............................................. G01B 11/24
[52] U.S. Cl. ..................................... 356/371; 358/106
[58] Field of Search ................ 356/371; 250/571, 572; 358/106

[56] References Cited

U.S. PATENT DOCUMENTS

| 4,735,508 | 4/1988 | Bellio | 356/371 |
| 4,929,846 | 5/1990 | Mansour | 356/371 |
| 4,978,219 | 12/1990 | Bessho | 356/349 |

OTHER PUBLICATIONS

"Laser Evaluation of Cutting Angle and Surface Finish in Scalpel Blades", Devdas Shetty—Journal of Testing and Evaluation (1982) pp. 25–27.
"Computer Identification of Machines Surfaces", Shetty et al. Journal of Testing and Evaluation, vol. 12, No. 6, pp. 375–379 (1984).
"Evaluation of Engineering Surfaces by Diffraction Pattern Analysis", Shetty et al., Transactions of the ASME, vol. 106, pp. 216–218 (1984).
"Roughness Measurement with A Laser Scanning Analyser", G. M. Clarke and T. R. Thomas, International Conference on Metrology and Properties of Engineering Surfaces, Leicester, Apr. 18–20, 1979.
"The Measurement and Data Analysis Used to Evaluate Highway Roughness", James Wambold, International Conference on Metrology and Properties of Engineering Surfaces, Leicester, Apr. 18–20, 1979.
"An Automatic Topographical Surface Reconstruction in the SEM", J. Lebiedzik, Scanning, vol. 2, pp. 230–237 (1979).
"New Experiments on Non-Contact Inspection of Ground Turbine Blades", Shetty et al.—distributed at the annual Winter meeting of the American Society of Mechanical Engineers (A.S.M.E.) on Dec. 10–15, 1989.
"A Comparison Between Talysurf 10 and Optical Measurements of Roughness and Surface Slope", L. H. Tanner, International Conference on Metrology and Properties of Engineering Surfaces, Leicester, Apr. 18–20, 1979.
"Bringing Image Processing Into Focus", J. Blattenbauer and Y. Kim, Mechanical Engineering, Jul. 1989, pp. 54–56.
"Dimensional and Surface Roughness Controls in a Turning Operation", M. Shiraishi and S. Sato, Journal of Engineering for Industry, pp. 78–83 vol. 112, (Feb. 1990).
"High Speed Surface Roughness Measurement", D. Jansson, J. Rourke and A. Bell, Journal of Engineering for Industry, vol. 106 (1984).
"Direct and Inverse Problems for Light Scattered by Rough Surfaces", E. Marx and T. Vorburger, Applied Optics, vol. 29, No. 25, pp. 3613–3626 (Sep. 90).

*Primary Examiner*—F. L. Evans

[57] ABSTRACT

A non-contact visual system for analyzing surface roughness directs onto the surface of a workpiece a laser beam which is reflected from the surface with a diffraction pattern. The image of the reflected diffraction pattern is captured on a mirror and reflected onto a display screen, and this displayed image is converted into analog signals which, in turn, are converted into digital data. The intensity of the captured image is determined from the digital data, and the data on the determined intensity of the captured image are compared with data on intensity from calibrated standards of surface roughness. From this comparison, the surface roughness of the workpiece is determined. The preferred technique uses a rasterizing graphics adapter for converting the output of a video camera into the digital signals and only pixels above a predetermined brightness value are utilized.

20 Claims, 4 Drawing Sheets

UNIT OF DISTANCE
(a)

UNIT OF DISTANCE
(b)

FIG. 5

| OPERATOR RESPONSE | DISPLAY INTERFACE |
|---|---|
| "1" & "ENTER" KEYS | VISION SYSTEM MAIN MENU<br>(1) CALIBRATE<br>(2) MEASURE WORKPIECE<br>(3) EVALUATE IMAGES<br>(4) EXIT |
| PLACE SAMPLE STANDARD & "ENTER" KEY | PLACE THE 2 MICROINCH LAPPED FINISH STANDARD UNDER THE LASER. CENTER THE IMAGE ON THE PROJECTION SCREEN. MOVE THE CAMERA TO CENTER THE IMAGE ON THE MONITOR. PRESS ENTER WHEN READY. |
| "3" & "ENTER" KEYS | HOW MANY TIMES DO YOU WISH TO SAVE THE IMAGES? SELECT A MINIMUM OF 3. |
| PLACE SAMPLE STANDARD & "ENTER" KEY | PLACE THE 16 MICROINCH STANDARD INTO POSITION UNDER THE LASER. PRESS ENTER WHEN READY. |
| "3" AND "ENTER" KEYS | SAVING FILE FOR CALIBRATION. CALIBRATING. PLEASE STAND BY. CALIBRATION COMPLETE. HOW MANY TIMES DO YOU WISH TO SAVE IMAGE? (3 MINIMUM) |
| PLACE WORKPIECE & "ENTER" KEY | PLACE THE WORK PIECE INTO AND POSITION UNDER THE LASER. PRESS ENTER WHEN READY.<br><br>SAVING FILE FOR EVALUATION.<br><br>EVALUATION COMPLETE. |
| "1" & "ENTER" KEYS | TYPE THE NUMBER TO IDENTIFY FINISHING METHOD THEN PRESS ENTER.<br>(1) LAPPED/HONED<br>(2) GROUND RECIPROCATING<br>(3) GROUND ROTARY<br>(4) TURNED<br>(5) MILLED<br>(6) MATTED FINISH<br>(7) EXIT<br><br>THE SURFACE FINISH IS 7 MICROINCHES.<br>ENTER:<br>(1) FOR ANOTHER WORKPIECE<br>(4) RETURN TO MAIN MENU<br>"E" TO EXIT PROGRAM |

METHOD AND APPARATUS FOR SURFACE ROUGHNESS MEASUREMENT USING LASER DIFFRACTION PATTERN

BACKGROUND OF THE INVENTION

The present invention relates to the measurement of surface roughness and, more particularly, to methods and apparatus for such measurements.

An essential part of quality control in many manufacturing operations is the measurement of the quality of the surface finish of the parts produced, and, more particularly, the roughness (or smoothness) of the surface. Although appearance or aesthetics are often the basis for concern for evaluating the roughness of a surface, equally often the primary reasons relates to the specific applications for the parts. For example, bearing surfaces which are too finely finished will not be able to hold the lubricants needed to minimize wear; the microscopic pits and grooves—of the finish—serve as the reservoirs for the lubricants. Parts such as turbine blades which are subject to high stress may fail due to stress corrosion and metal fatigue if their finish is too coarse.

Manufacturing processes which involve working of a part generally result in scratches, dents and gouges. As an example, the surface finish at the root of a turbine blade may be considered to exhibit a series of fine, overlapping scratches; the finer the finish, the smaller and shallower the scratches. These scratches may be regarded as microfractures which barely penetrate the surface. However, as the blade flexes under stress, the forces transmitted to the blade root cause the scratches to enlarge and extend deeply into the metal until, eventually, the blade will snap. Since the fracture of even a single turbine blade at a high rotary velocity can cause major damage, the aircraft engine manufacturers regard each turbine blade as a potential weak link in the chain of components whose composite mean time to failure determines engine service life. Therefore, the many turbine blades which go into an engine are inspected for surface finish, and this is an extremely costly and time consuming process.

One commonly used method of inspection is visual comparison with a sample of known surface roughness. The inspector determines whether the workpiece is better or poorer than the sample standard. Comparison with a range of standards then serves to bracket the surface finish of the workpiece as lying between that of the most similar coarser finished and finer finished samples.

Another commonly used method of surface finish measurement is the profilometer. This typically consists of a fine stylus connected to a linear variable differential transformer. The workpiece is securely mounted on an inspection surface plate and the stylus, mounted on an adjustable holder, is drawn across the lay, or grain, of the workpiece. This method also typically uses sample standards of known surface finish to calibrate the profilometer. It commonly provides repeatably accurate measurement of surface finishes down to 5 microinches. With exceptional care, surface finishes as fine as 3 microinches can be measured.

Both of these methods have serious drawbacks; the visual comparison method is highly subjective, while the profilometer method is only useful for measurements across the lay of the finish. Furthermore, both are primarily useful for flat surfaces. Workpieces of complex shape, or with recessed surfaces are difficult, if not impractical, to measure by either of these methods. Therefore, there have been efforts in recent years to develop alternative methods for evaluating surface finish, which methods are not subjective and do not require physical contact with the workpiece. A further goal has been to devise a method which can be used by relatively unskilled personnel, and which lends itself to automation in order to reduce the high cost of surface finish evaluation.

There have also been efforts to develop techniques which measure and analyze light reflected from the workpiece surface, and these can be classified into the following groups based on the methodology:

1. Light projection technique
2. Interferometry
3. Measurement of reflected beam positional variations The light projection technique is described by Shetty in "Laser Evaluation of Cutting Angle and Surface Finish in Scalpel Blades", *Journal of Testing and Evaluation*, 1982. The profile of a thin edge is projected onto an inclined screen, thereby producing a magnified shadow roughness profile image. The interference effect associated with a thick specimen and the surface are reported to give rise to spurious magnification and limit the specimen thickness. A roughness range from 2 to 4.7 microinches was found to be measurable.

An interferometry technique is described by Bennett in "Stylus Profiling Instrument for Measuring Statistical Properties of Smooth Optical Surfaces", *Applied Optics* 20, 1785-1802 (1981). He used two coherent beams split by a partially transmitting mirror to observe the fringe patterns in an interferogram.

The positional variation of reflected light is described by Shiraishi in "Dimensional and Surface Roughness Controls in a Turning Operation", *Journal of Engineering for Industry*, Vol. 112, p. 78-83 (1990). This measurement system uses double laser beams normal to the surface, and he discusses the variation of surface roughness and tries to link it to the signal variations from the photodiode.

The recent work of Marx and Vorburger, "Direct and Inverse Problems for Light Scattered by Rough Surfaces" reported in *Applied Optics*, Vol 29, No. 25 (1990) is of interest. The authors describe an experimental setup which they devised to perform non-contact measurement of surface roughness by comparing the specular and the scattered reflection components from a laser beam incident on the workpiece. Earlier researchers had employed a small number of photodetectors which were moved mechanically through a series of positions in order to observe the diffraction pattern over a relatively wide range of angular aspect of the light scattered from the workpiece. Marx and Vorburger improve on this approach by constructing a semicircular yoke which contains 87 photodiodes spaced 2° apart about its periphery and which can be pivoted about the chord lying in its horizontal axis. The field of view of each diode subtends an angle of 1.5°, so that stepwise rotation of the yoke about its horizontal axis results in successively overlapped arcuate fields of view which can be combined into a hemispherical plot of the pattern of diffracted light intensity.

The characteristics of a laser beam which make it ideal for this application are the extremely low divergence, or angular spread, of the beam, and the sharply defined edges of the illuminated spot where the beam is incident on a surface. To understand the principle involved, one should imagine that a laser beam is directed onto an optically polished surface, and that a photodetector whose aperture matches the reflected spot size is positioned only a short distance away, where it can intercept the reflected beam. Over this short distance, the increase in beam diameter is miniscule, and, because of the high polish of the reflecting surface, the edges of the spot remain crisp. Therefore, one can assume that all of the energy is captured by the photodetector.

However, if the surface is not highly polished, then the reflection will be diffuse (a diffraction pattern); the spot edges will be blurry; and part of the energy will be spread over a wider angle. The coarser the finish, the more diffuse will be the diffraction pattern. In practice, diffraction patterns are observed which are not only relatable to the fineness of the surface finish, but also are characteristic of the illuminated object. Thus, a wire, a mesh screen, etc., yield patterns immediately recognizable as specific to these objects. When the object is a flat or smoothly curved surface, diffraction patterns result which are sufficiently repeatable to serve as identifiers of the finishing process.

However, commercial interest is not in the phenomena, but in the measurement of the surface finish. Although prior efforts in this area have suggested the potential for measuring surface finish through analysis of the diffraction pattern observed from a laser illuminated surface, prior instrumentation has not been practical for use in a manufacturing environment, either because of cost considerations or because of the equipment complexity. The equipment used by Marx and Vorburger, while intended as an experimental set-up, illustrates the complexity of prior equipment designed to capture and analyze such diffraction patterns.

It is an object of the present invention to provide a novel non-contact method for evaluating surface roughness of various engineering surfaces which reflect light and produce a diffraction pattern.

It is also an object to provide such a method which measures surface roughness on surfaces with variable geometry which would normally prohibit measurement by current instruments other than those for visual comparison.

Another object is to provide such a method which measures surface roughness of the workpiece without restriction to the orientation of the workpiece, i.e., whether normal or tangential or any other orientation to the lay.

Still another object is to provide such a method which provides quick, accurate measurements to reduce the processing time and the memory requirements of the computer for each workpiece.

A further object is to provide a method which allows the operator to interact in the form of a menu driven procedure.

A still further object is to provide novel apparatus for optical evaluation of surface roughness to provide accurate, convenient and quick multiple measurements of an engineering workpiece.

SUMMARY OF THE INVENTION

It has now been found that the foregoing and related objects may be readily attained in a non-contact method for analyzing surface roughness utilizing a vision system in which there is directed onto the surface of a workpiece at a specific angle of incidence a beam of collimated monochromatic light. A diffraction pattern is produced in the light reflected from the surface, and the image of the reflected diffraction pattern is captured on a mirror and reflected onto a display screen.

The diffraction pattern image displayed on the screen is converted into analog signals, which in turn are converted into digital data. The intensity of the captured image is determined from the digital data, and compared with data on intensity from calibrated standards of surface roughness. The surface roughness of the workpiece is then determined from this comparison.

The analog signals are converted into digital data by determination of pixels per unit length of the workpiece surface, and the pixels utilized in the determination are only those above a predetermined brightness threshhold value.

The conversion of the analog signals is effected by apparatus including a rasterizing graphics adapter, and the conversion into analog signals is effected by a video camera. The workpiece is moved a finite distance relative to the mirror and laser beam generator, and the surface roughness at multiple locations is determined. The surface roughness determined at the multiple locations is then averaged. The workpiece is moved in a direction perpendicular to the axis of the laser beam for generating the multiple determinations.

Usually, the light beam is directed onto the workpiece perpendicular to the lay of the engineering surface. However, it may be directed onto the workpiece tangential to the lay of the engineering surface, in which case the comparison is made with standards calibrated perpendicular to the lay, and the data are modified by a mathematical formula. This formula is $$\text{surface roughness} = \frac{[B_2 - B_1[Y_3 - Y_1 + K]]}{[Y_2 - Y_1]} + B$$

where
$K = A/2 \, [1 + \cos[2\theta + 180]]$
$A$ = constant [intensity difference between parallel and perpendicular to the lay]
$\theta$ = angle between incident beam and the lay of workpiece
$B_1$ = highest calibrated surface roughness
$B_2$ = lowest calibrated surface roughness
$Y_1$ = frequency intensity of $B_1$
$Y_2$ = frequency intensity of $B_2$
$Y_3$ = frequency intensity of the measured workpiece In one embodiment, the laser beam generator produces a multiplicity of discrete laser beams impinging upon the surface of the workpiece at spaced points, and each of these beams produces a spaced diffraction pattern image upon the mirror and the screen, and the data from the multiple images is averaged and compared with the calibrated standards. The multiplicity of laser beams is conveniently provided by fiberoptic cables.

In another embodiment, the laser beam generator includes a fiberoptic cable probe. This may be utilized with a workpiece having a non-planar or recessed surface, adjacent to which the end of the probe is positioned to direct the laser beam onto portions of this surface in a manner to effect reflection therefrom onto a mirror.

BRIEF DESCRIPTION OF THE DRAWINGS

FIG. 5 shows a typical sequence of computer generated prompts and the interactive responses of an operator, in a computer based system for surface finish evaluation employing the method and apparatus of the present invention.

DETAILED DESCRIPTION OF THE PREFERRED EMBODIMENTS

Figure 1A:
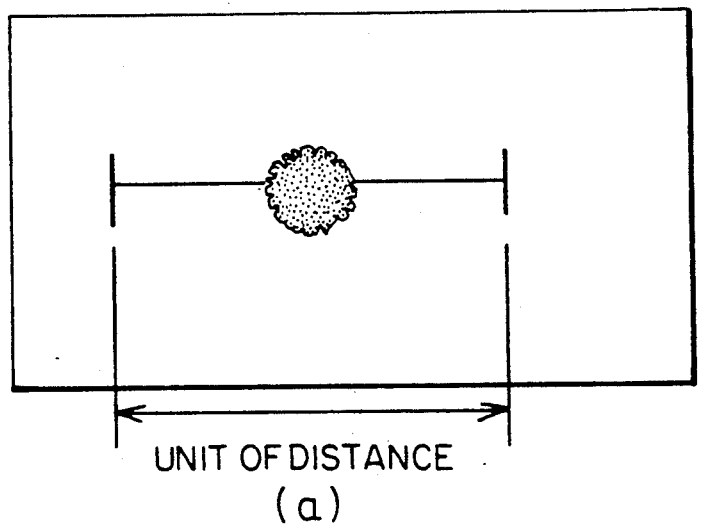
FIG. 1A illustrates the diffraction pattern observed on a screen when a laser beam is reflected from a highly polished surface and onto a screen.

FIG. 1A shows the diffraction pattern of a laser beam when reflected from a highly polished surface onto a screen. The image is sharp since it has been reflected in essentially unaltered form, although it may be somewhat elliptical due to the angularity of the beam relative to the surfaces.

Figure 1B:
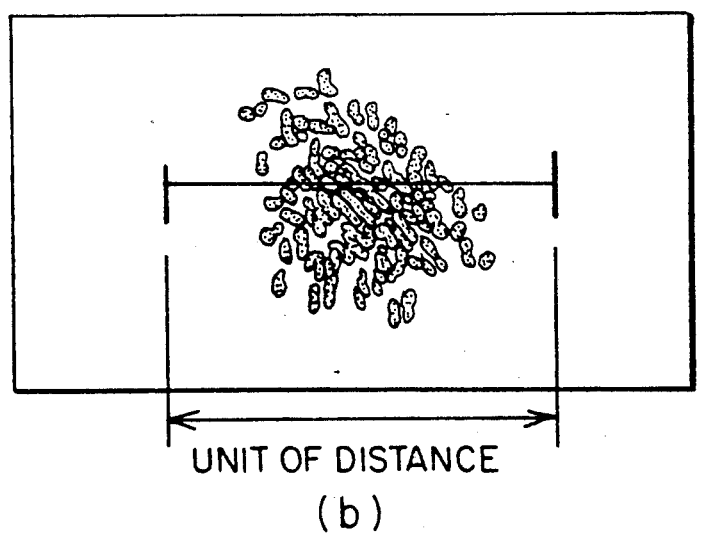
FIG. 1B illustrates the diffraction pattern observed on a screen when a laser beam is reflected from a rough surface and onto a screen.

FIG. 1B shows the diffraction pattern of the laser beam when reflected from a rough surface. In effect, the energy is scattered and is reflected not at one angle, but in a multiplicity of directions and angles. Although the total energy seen on the screen may be the same as in FIG. 1A, this energy is now scattered. This figure, which is reproduced in high contrast, does not show the variation in intensity between the many spots of light, and it does not show the haze or background illumination which also results and which is apparent to the eye and to a video camera.

Figure 2:
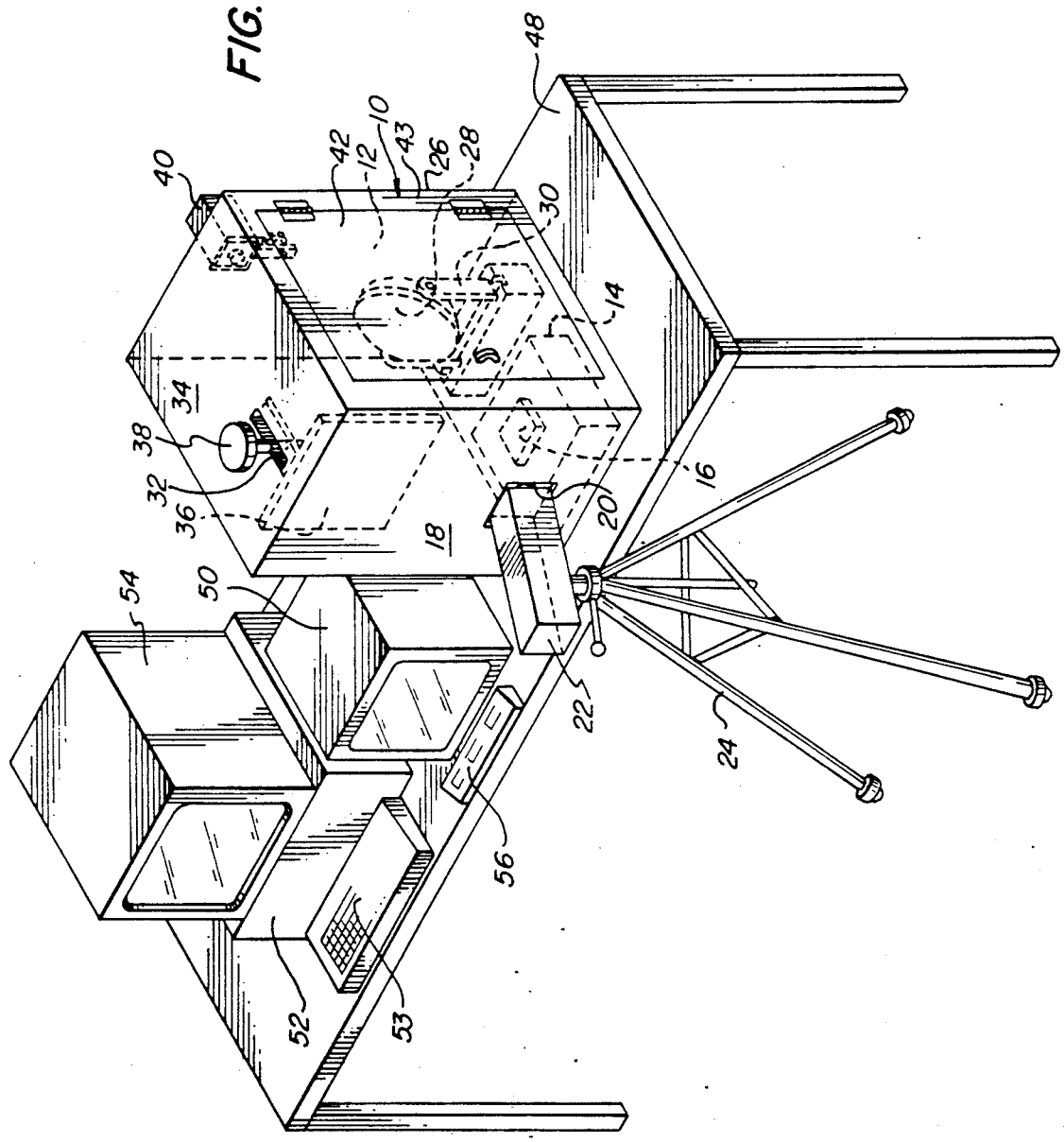
FIG. 2 is a perspective view of an installation embodying the present invention with the laser beam generator external to the inspection chamber and the video monitor and computer positioned alongside that chamber.
Figure 3:
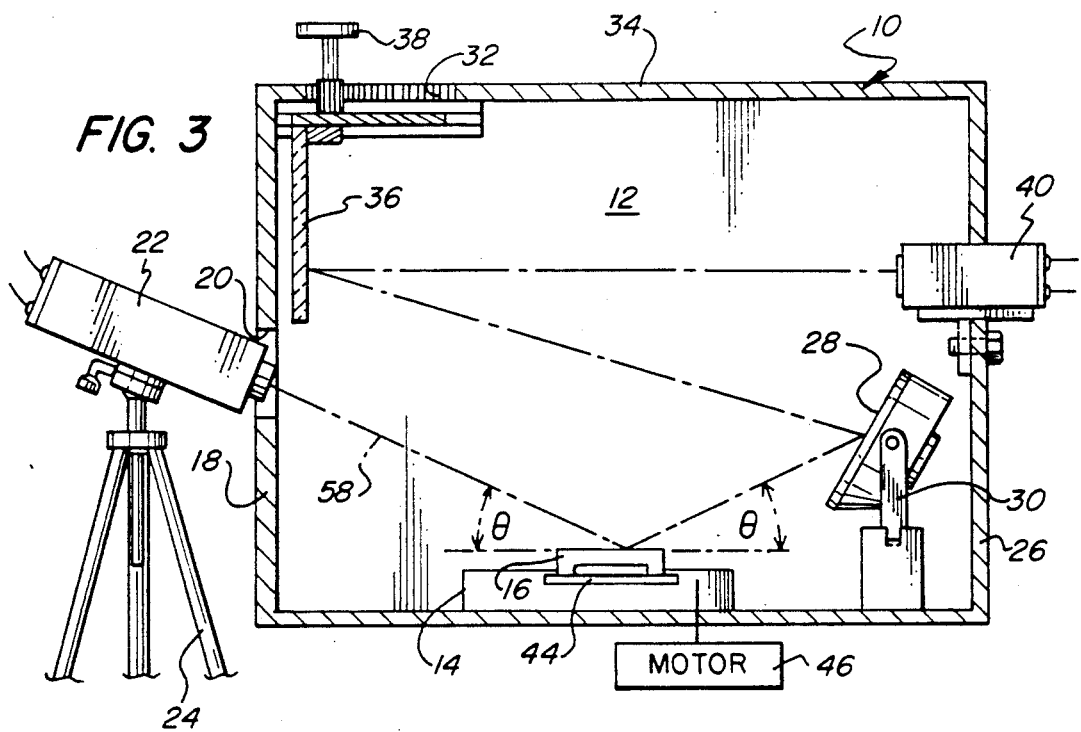
FIG. 3 is a diagrammatic view illustrating the light ray paths from the laser beam generator to a standard or workpiece, the reflected ray path to a mirror, and the ray path from the mirror to a viewing screen which is observed by a video camera.

FIGS. 2 and 3 show an installation for practicing the method of surface finish evaluation of the present invention. An enclosure generally designated by the numeral 10 provides an inspection chamber 12 which contains a mounting block 14 upon which standard samples and workpieces 16 are positioned. In the front wall 18 of the enclosure 10 is an aperture 20, and a laser beam generator 22 is pivotably supported upon the tripod 24 with its discharge end extending through the aperture 20. The laser beam generator 22 is supplied with power by a suitable cable (not shown) and is positioned to direct its beam at an angle onto the upper surface of the workpiece 16.

Adjacent the rear wall 26 of the enclosure 10 is a mirror 28 which is supported upon a swivel mount 30 so that its angular orientation may be varied. Supported on a positioning mechanism 32 carried by the top wall 34 is a vertically oriented screen 36 which may be moved relative to the front coated mirror 28 by the focusing knob 38. Supported on the rear wall 27 is a video camera 40, and a hinged access door 42 is provided in the sidewall 43 of the enclosure 10.

As seen in FIG. 3, the mounting block 14 desirably includes a stage 44 which is movable along X and Y axes by a servomoter 46 therewithin.

In this installation, the enclosure is supported on a bench 48 upon which are also placed a display monitor 50, a computer 52 with its video monitor 54 and keyboard 53, and a control panel 56.

As seen in FIG. 3, the laser beam 58 impinges upon the surface of the workpiece 16 and is reflected therefrom to the surface of the mirror 28 where it is captured as a diffraction image. This captured image is reflected onto the display screen 36, and the video camera 40 records this image as analog data in the form of pixels. The analog data are converted by a rasterizing graphics adapter in the computer 52, and the image is displayed on the display monitor 50. The data signals are concurrently processed by the computer 52 which generates a display of the roughness determinations on its monitor 54.

As will be appreciated, a control panel 56 may be utilized to control the operation of the laser 22, the video camera 40 and the servomotor 46 as well as other elements of the assembly.

Desirably, the mirror 28 is mounted upon a swivel mount 30 which is controlled by servomotors (not shown) to enable pivoting about horizontal and vertical axes for mechanically centering the captured image on the screen 36, and a servomotor (not shown) for the positioning mechanism 32 will provide similar advantages to effect focusing of the captured image on the screen 36.

Figure 4:
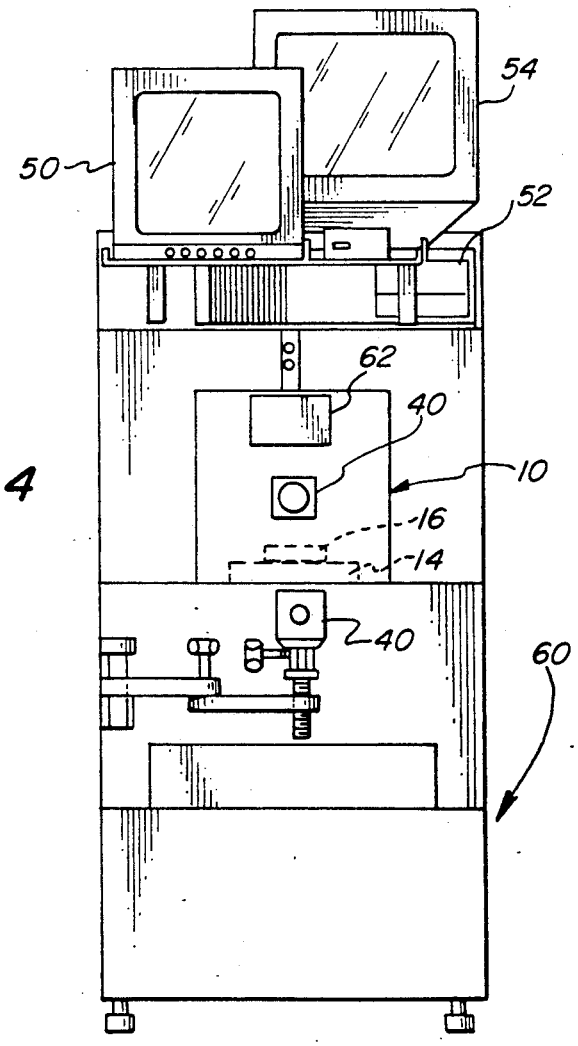
FIG. 4 shows an installation of the equipment of FIG. 2 in an equipment rack.

FIG. 4 illustrates how the components of FIG. 2 may be housed in a standard rack-type cabinet designated by the numeral 60. In this arrangement, it is apparent that video camera 40 need not be mounted on the rear wall of the enclosure 10, and instead may be externally mounted and focused on the diffraction pattern formed on the translucent image screen 62, which is itself mounted in the rear wall of the enclosure 10 in this embodiment. This arrangement offers greater flexibility in terms of the focal length of the video camera lens.

Turning now to FIG. 5, this shows a computer assisted interactive session in which the equipment operator wishes to evaluate workpieces with a surface finish lying somewhere in the range of from 2 to 16 microinches. This figure shows a sequence of displays and prompts, as well as the operator's responses. The vertical arrows indicate sequence rather than signal flow. A printout of the program source code is submitted herewith.

Once the measurements have been taken for each standard in the calibration procedure, a calibration curve is calculated by the computer. From this point, the main menu appears and allows the operator to begin measurement of the workpiece. The measurement section follows the same general procedure as the calibration procedure. However, the apparatus will normally allow for the measurement of only one workpiece at a time. The option for the number of measurements requested is the same with a minimum of three readings.

This procedure provides the operator the ability to choose the process which best describes how the workpiece was manufactured. Based upon his or her selection, the proper calibration data is used by the computer for comparison to the actual workpiece measurements. The surface finish is computed, printed to the computer monitor and a hard copy may be printed on an associated printer.

In contrast to the complexity of prior methods, the present invention requires no mechanical scanning since it uses the normal, electronic scanning of video camera to generate the digitally processible, pixel-by-pixel representation of the diffraction pattern. Test results with this system have shown its effectiveness whether the laser illumination is perpendicular or tangential to the lay of the surface finish. In addition, tests with various surface roughnesses have demonstrated the accuracy of this invention in measuring surface roughness in the range of from 2 microinches to 300 microinches. Those tests have shown that the only change needed as surface roughness increases is an increase in the output of the laser to compensate for the increasingly diffuse diffraction pattern. Thus, in one embodiment of the present invention, while a 1 milliwatt laser sufficed for surface roughness of between 2 and 16 microinches, power increases to 5 milliwatts and 10 milliwatts, respectively, were required to accommodate surface roughness of 16–64 microinches and 64–300 microinches.

Thus, it can be seen that the present invention achieves the object of process simplification by combining features of the visual comparison method with an interactive, computer directed system of reference sample and workpiece placement, entering of data generated by known standards and, finally, automated comparison of the diffraction patterns reflected off the reference samples and the workpieces.

The hardware elements of the present invention comprise an illumination chamber housing a surface on which standard samples or workpieces are placed for illumination by the laser, a mirror for projecting the diffraction pattern reflected from the samples and workpieces onto a screen, a video camera, a video monitor for observing the patterns to center and focus them, a computer with a raster graphics adapter board for pixel-by-pixel capture of the image observed by the video camera. The computer interacts with the operator to direct the successive placement of samples and workpieces, processes the image data, and it automatically computes the fineness of the workpiece surface finish.

The extensive research leading to the present invention establishes the fact that surface finishes within contiguous, narrow ranges of roughness may be accurately compared by applying empirically derived conversion factors to the number of discrete bright spots or blips per unit distance of the observed diffraction pattern that are brighter than a preset threshold value. In effect, the area covered by the diffraction pattern is treated as comprising the video scan raster lines, strung end-to-end.

The digitizing adapter reduces the image into a three dimensional array. Each element of the array consists of an "x" component, a "y" component, and a color component. The color component is in the range of 0 to 255. Since the system is a black and white system, each value represents a different shade of grey; black being equal to 0 and white equal to 255. It is this color component which is equated to intensity.

The angle of incidence of the laser beam on the workpiece does affect the diffraction pattern. Large angles tend to spread the diffraction pattern, and small angles tend to focus it about the center.

The accurate placement of the sample standards and workpieces may be simplified by use of suitably configured holders and jigs on or in the mounting block to ensure proper orientation with respect to the illuminating beam. When a workpiece has different types of surfaces, it is usually evaluated at the several surface locations, and each such surface is treated as a new workpiece specimen with an appropriately positioned jig.

Multiple evaluations may be essential if the workpiece or surface contains several places with distinct machining or surface characteristics to be evaluated. Illustratively, a precision machined piston head would have both a honed bore and one or more lapped grooves. Each of those regions would require separate evaluation of its surface finish. In such cases, the computer program may include an additional routine to identify each workpiece by operator key-in of a serial or other identifying number so an entire batch could be evaluated for one surface before the jig is repositioned or changed to evaluate another surface. The computer could then compile the details of the surface finish for each surface of each workpiece before reporting them to the operator when the process was complete. This data file could also serve to document the pass/fail status of each workpiece; to pinpoint those parts of the finishing process which require improvement; and to provide statistical records of the quality of a finisher's work product.

Moreover, evaluating the image from the same surface area several times will generally average out the phenomenon of glint, in which the laser image reflected from an object appears to scintillate.

As will be appreciated from the foregoing description, the process of the present invention may be considered as comprising four steps, namely;

1) Calibration
2) Workpiece Measurement
3) Image Evaluation
4) Display of Results The apparatus of the present invention has a calibration procedure built in as a part of the surface roughness evaluation. Calibration has to be followed any time any changes are made, whether these changes are machining process related or related to the apparatus set up and reorganization.

The purpose of calibration is to enable the correlation between the analyzed diffraction pattern and surface finish by using samples of known surface finish as calibration standards at each end of the surface finish range under evaluation. By a conversion equation for the measured data within the range established by the calibration end points, the measured data for a workpiece can be converted by interpolation into the surface roughness which they represent. This conversion equation is typically linear, and it may automatically compensate for the effects of such factors as the type of material and the finishing method. This approach takes advantage of the fact that interpolation is an accurate method of determining the result of a process if the calibrated end points of the range in which the interpolation is to be made are close together. Therefore, in the present invention, the range of surface roughness from 2 microinches to 300 microinches may be divided into three segments, respectively encompassing the ranges 2–16, 16–64, and 64–300 microinches.

In calibrating the instrument, surface finish standards are used. The first step is to align the diffraction pattern image to the center of the display screen. In the procedure as embodied in the illustrated installation, there is provision for live video mode of operation in which the display monitor is directly coupled to the recording unit so that the diffraction pattern image as seen by the camera is displayed on the video monitor in real time. While in this mode, the alignment operation is conducted by reflecting the laser beam from a standard surface of a specimen instead of the actual workpiece. Once the beam image has been centered on the display screen, calibration can continue. The calibration is done using standards which have been defined specifically for the specific machining process of interest. Several readings are taken on a standard with a smoother surface and then several on a standard with a rougher surface. From this data, the computer calculates a calibration curve using a mathematical relationship. It is this primary curve which will be used as a reference for the purpose of comparison in subsequent measurements.

The method for workpiece measurement has been described previously. However, it should be pointed out that at least three discrete areas should be analyzed and the data averaged for more reliable evaluations of the character of the surface.

The procedure for image evaluation and analysis is carried out in the computer where the data acquired in the measurement procedure is mathematically averaged and compared to the data acquired in the calibration procedure. The results are calculated by mathematical formulae which may be specifically applied based upon known standards for each combination of machining process and material, and which may be varied based upon factors which may readily be ascertained during use of the process.

A calibrating procedure has been established for the inter-relationship between the roughness in the tangential direction when the roughness in the direction normal to the lay of the engineering surface is known. The following equation is used to determine the roughness in the tangential direction from the roughness in the normal direction of the standard employed for calibration.

$$\text{Surface Roughness} = \frac{[B_2 - B_1[Y_3 - Y_1 + K]]}{[Y_2 - Y_1]} + B_1$$

where
$K = A/2[1 + \cos[2\theta + 180]]$
  $A$ = constant [intensity difference between parallel and perpendicular to the lay]
  $\theta$ = angle between incident beam and the lay of workpiece
  $B_1$ = highest calibrated surface roughness
  $B_2$ = lowest calibrated surface roughness
  $Y_1$ = frequency intensity of $B_1$
  $Y_2$ = frequency intensity of $B_2$
  $Y_3$ = frequency intensity of the measured workpiece The ability to measure the tangential direction has also assisted in measuring the roughness of curved surfaces.

It has also been found that the range of measurement may be extended by using a polarizing filter and varying the intensity. Experimental results have shown that a laser with 1 mw power is desirably used for the range 2 to 16 microinches rms. A 5 mw laser may be used for the range of 16 to 64 rms, and a 10 mw laser may be used for the range of 64 to 300 rms.

The present invention is applicable to a broad range of materials, finishing methods, surface finishes and workpiece shapes because it is based on empirical data readily determined by use of the data on pixels above a minimum brightness level in the target area.

Thus, it can be seen that the method and apparatus of the present invention provide a novel and efficient evaluation of surface roughness by an optical technique which is not limited to a single orientation of the workpiece. The measurement may be effected quickly and accurately based upon samples of known roughness, and a simple computer program may effect the conversion of the observed data into the desired surface finish evaluation.

Having thus described the invention, what is claimed is:

1. In a non-contact method for analyzing surface roughness utilizing a vision system, the steps comprising:
   (a) directing onto the surface of a workpiece at a specific angle of incidence a beam of collimated monochromatic light and thereby producing a diffraction pattern in the light reflected from said surface;
   (b) capturing the image of the reflected diffraction pattern in the reflected light on a mirror and reflecting it onto a display screen;
   (c) converting the diffraction pattern image displayed on said screen into analog signals;
   (d) converting said analog signals into digital data;
   (e) determining the intensity of the captured image from said digital data;
   (f) comparing the data on the determined intensity of the captured image with data on intensity from calibrated standards of surface roughness; and
   (g) determining the surface roughness of said workpiece from said comparison.

2. The non-contact method for analyzing surface roughness in accordance with claim 1 wherein said analog signals are converted into digital data by determination of pixels per unit length of the workpiece surface.

3. The non-contact method for analyzing surface roughness in accordance with claim 2 wherein the pixels utilized in said determination are only those above a predetermined brightness threshhold value.

4. The non-contact method for analyzing surface roughness in accordance with claim 1 wherein said conversion of said analog signals is effected by apparatus including a rasterizing graphics adapter.

5. The non-contact method for analyzing surface roughness in accordance with claim 1 wherein said conversion into analog signals is effected by a video camera.

6. The non-contact method for analyzing surface roughness in accordance with claim 1 wherein said workpiece is moved a finite distance relative to said mirror and the source of said beam of collimated monochromatic light, and the surface roughness at multiple locations is determined.

7. The non-contact method for analyzing surface roughness in accordance with claim 6 wherein said surface roughness determined at multiple locations is averaged.

8. The non-contact method for analyzing surface roughness in accordance with claim 6 wherein said workpiece is moved in a direction perpendicular to the axis of said beam of collimated monochromatic light beam.

9. The non-contact method for analyzing surface roughness in accordance with claim 1 wherein said workpiece has an engineering surface and said light beam is directed onto said workpiece perpendicular to the lay of the engineering surface.

10. The non-contact method for analyzing surface roughness in accordance with claim 1 wherein said workpiece has an engineering surface and said light beam is directed onto said workpiece tangential to the lay of the engineering surface.

11. The non-contact method for analyzing surface roughness in accordance with claim 10 wherein said comparison is made with standards calibrated perpendicular to the lay and the data are modified by a mathematical formula.

12. The non-contact method for analyzing surface roughness in accordance with claim 11 wherein said mathematical formula is $$\text{surface roughness} = \frac{[B_2 - B_1[Y_3 - Y_1 + K]]}{[Y_2 - Y_1]} + B_1$$

where
$K = A/2[1 + \cos[2\theta + 180]]$
$A$ = constant
$\theta$ = angle between incident beam and the lay of workpiece
$B_1$ = highest calibrated surface roughness
$B_2$ = lowest calibrated surface roughness
$Y_1$ = frequency intensity of $B_1$
$Y_2$ = frequency intensity of $B_2$
$Y_3$ = frequency intensity of the measured workpiece 13. The non-contact method for analyzing surface roughness in accordance with claim 1 wherein the source of said beam of collimated monochromatic light produces a multiplicity of discrete laser beams impinging upon the surface of said workpiece at spaced points, and each producing a spaced diffraction pattern image upon said mirror and said screen, and the data from the multiple images is averaged and compared with the calibrated standards.

14. The non-contact method for analyzing surface roughness in accordance with claim 13 wherein said multiplicity of laser beams is provided by fiberoptic cables.

15. The non-contact method for analyzing surface roughness in accordance with claim 1 wherein the source of said beam of collimated monochromatic light includes a fiberoptic cable probe.

16. The non-contact method for analyzing surface roughness in accordance with claim 15 wherein said workpiece has a non-planar surface adjacent which the end of said probe is positioned to direct the laser beam onto portions of said surface.

17. In apparatus for non-contact analysis of surface roughness utilizing a vision system, the combination comprising:
 (a) a housing providing an inspection chamber with a workpiece support therein;
 (b) a laser beam generator for directing a beam of collimated monochromatic light onto the surface of an associated workpiece placed on said support at a specific angle of incidence, and thereby producing a diffraction pattern in the light reflected from the workpiece surface;
 (c) a mirror for capturing the image of the reflected diffraction pattern in the reflected light beam and reflecting said image;
 (d) a display screen for receiving the image of the reflected pattern from said mirror and displaying it;
 (e) a video camera focused on said screen for converting the diffraction pattern image displayed on said screen into analog signals;
 (f) means for converting said analog signals into digital data;
 (g) computer means for determining the intensity of the captured image from the digital data, for comparing the data on the determined intensity of the captured image with data on intensity from calibrated standards of surface roughness, and for determining the surface roughness of the workpiece from said comparison; and
 (h) means for displaying the results of such determination.

18. The analyzing apparatus in accordance with claim 17 wherein said analog signal converting means determines pixels per unit length of the workpiece surface.

19. The analyzing apparatus in accordance with claim 18 wherein said converting means utilized in said determination converts only those pixels above a predetermined brightness threshhold value.

20. The analyzing apparatus in accordance with claim 17 wherein said means for conversion of said analog signals includes a rasterizing graphics adapter.

* * * * *

UNITED STATES PATENT AND TRADEMARK OFFICE
CERTIFICATE OF CORRECTION

PATENT NO. : 5,189,490
DATED : February 23, 1993
INVENTOR(S) : Devdas Shetty and Henry Neault It is certified that error appears in the above-identified patent and that said Letters Patent is hereby corrected as shown below:

Column 11, line 17, after "A=constant, insert --[intensity difference between parallel and perpendicular to the lay]--.

Signed and Sealed this

Eleventh Day of January, 1994

Attest:

BRUCE LEHMAN

Attesting Officer — Commissioner of Patents and Trademarks